Patented Dec. 18, 1923.

1,477,804

UNITED STATES PATENT OFFICE.

CLAYTON W. BEDFORD AND ROBERT L. SIBLEY, OF AKRON, OHIO, ASSIGNORS TO THE GOODYEAR TIRE & RUBBER COMPANY, OF AKRON, OHIO, A CORPORATION OF OHIO.

PRODUCTION OF THIOCARBANILIDE.

No Drawing. Original application filed August 12, 1918, Serial No. 249,581. Divided and this application filed November 24, 1919. Serial No. 340,253.

*To all whom it may concern:*

Be it known that we, CLAYTON W. BEDFORD and ROBERT L. SIBLEY, citizens of the United States, residing at Akron, in the county of Summit and State of Ohio, have invented a new and useful Improvement in the Production of Thiocarbanilide, of which the following is a specification.

The present invention relates to the production of thiocarbanilides by a method peculiarly suitable for use in connection with the vulcanization of caoutchouc.

Thiocarbanilide is well known to be a valuable commercial accelerator for expediting and improving the vulcanization of rubber. In the manufacture of thiocarbanilide from aniline and carbon bisulphide, hydrogen-sulphide is produced in large quantities, and various methods have been resorted to for removing it from the reaction mixture in order to speed the reaction and to ensure its completion. Sulphur, for example, appears to act as a catalyst and very materially shortens the time of the reaction. Litharge or other metallic oxides may be used which will react with the hydrogen sulphide to produce metallic sulphides and water. Pyridine may also be used, its basic properties causing it to react with the acidic hydrogen-sulphide.

The present inventors have discovered a means by which the hydrogen-sulphide may be conveniently and expeditiously removed from the zone of the reaction, with all of the attendant advantages of this result, by the use of a compound present in the reaction zone and having a marked affinity for the hydrogen-sulphide and reacting therewith to produce a substance which may be permitted to remain admixed with the thiocarbanilide, where the latter is to be employed as an accelerator in the vulcanization of caoutchouc.

These desirable results are attained by the use of a paranitroso body, such, for example, as paranitrosophenol, or paranitrosodimethylaniline.

Example I:
186 grams aniline (2 molecules).
314 grams carbon bisulphide.
150 grams paranitroso-dimethylaniline (1 molecule).

The proper proportion of carbon bisulphide is arrived at as follows:

76 grams (1 molecule) for reaction with the aniline.

38 grams ($\frac{1}{2}$ molecule) for reaction with the base produced by the reaction of hydrogen sulphide with paranitrosodimethylaniline.

200 grams, excess for solvent action and temperature control.

The paranitroso-dimethyl-aniline and carbon bisulphide are mixed, and the aniline is slowly added thereto under a reflux condenser. The liquid is maintained at the boiling point in order to prevent the accumulation of aniline with a periodic violent reaction.

When the entire quantity of aniline has been added, the heating is continued under a reflux for a few minutes, and the excess carbon bisulphide is then distilled off. The residue which consists of thiocarbanilide in admixture with the thiocarbanilide derivative formed by the reaction of hydrogen sulphide and carbon bisulphide on the paranitroso-dimethyl-aniline, in the presence of aniline, may be used without further purification for the vulcanization process, a small percentage being added to the rubber mix (for example, from one-half to two per cent), and vulcanization then carried out in the usual manner.

Example II: One or three mols of aniline (93 g. or 279 g.) may be used instead of 186 g. as in Example I, with the result that there will be obtained mixed thiocarbanilides of slightly different properties. Three mols of aniline is apparently the maximum which will be forced to react with $CS_2$ by one mol of paranitroso-dimethyl-aniline. Paranitroso-dimethyl-aniline reacts with $H_2S$ up to two mols under the above conditions, the final reaction corresponding to the following equation:

$(CH_3)_2N-C_6H_4-NO + 3C_6H_5NH_2 + 2CS_2 =$

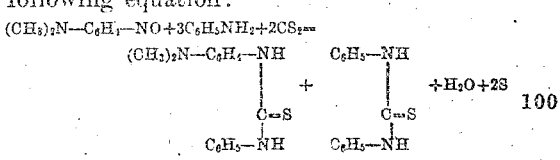

It is evident therefore that when using three mols of aniline it is a better method to dissolve the nitroso body in $CS_2$ and to run it into warm aniline in order to have sufficient aniline present at all times to give a complete reaction.

Where three molecules of aniline are employed, as in the foregoing example, the reaction probably proceeds in such a manner as to produce para-amido-dimethyl-aniline as an intermediate product. This compound then reacts with the aniline and carbon bisulphide present to form a mixture of symmetrical and unsymmetrical thio-urea derivatives which we have found to be particularly valuable for the vulcanization of caoutchouc.

It will be apparent from the above that in the paranitroso body named we have discovered a substance forming a highly desirable agent for expediting reversible reactions in which hydrogen sulphide is liberated, the affinity of the nitroso body for the hydrogen sulphide being so great as to cause the reaction by which it is produced in the shortest time to the highest possible degree of completion. In the examples given a formation of 100% of thiocarbanilide is easily attained, and the speed is limited only to the physical conditions of handling the material. It is readily apparent that the reaction may be applied generically to the formation of homologues of thiocarbanilide from primary aromatic amines in general, and it is intended that the terms thiocarbanilide and aniline, as used herein, are to be understood as designating generically these classes of compounds respectively.

The nature of the reaction between paranitroso-dimethyl-aniline and hydrogen sulphide and of the reaction between this reaction product and carbon bisulphide, together with the nature and uses of the products are very fully described in our co-pending applications Serial No. 249,579 and Serial No. 249,580, filed August 12, 1918.

This application is a division of our prior application Serial No. 249,581, filed August 12, 1918.

In the foregoing we have described in some detail three procedures in accordance with our invention, but it is to be understood that this is illustrative only and that the invention is neither limited to the examples given, nor dependent upon the accuracy of the theories which we have advanced by way of explanation, except in so far as such limitations form a part of the appended claims, in which it is our intention to claim all novelty inherent in our invention as broadly as is permissible, in view of the prior art.

What we claim is:

1. The method of producing a substituted thio-urea which consists in carrying out the reaction between a primary aromatic amine and carbon bisulphide in the presence of a paranitroso body.

2. The method of producing a substituted thio-urea which consists in carrying out the reaction between aniline and carbon bisulphide in the presence of paranitroso-dimethyl-aniline.

3. The method of producing a substituted thio-urea which comprises treating at least one mol of aniline with an excess over one mol of carbon bisulphide in the presence of paranitroso-dimethyl-aniline.

4. The method of producing a substituted thio-urea which comprises reacting upon aniline with carbon bisulphide in the presence of a paranitroso-body.

CLAYTON W. BEDFORD.
ROBERT L. SIBLEY.